United States Patent [19]
Mong-Hsing

[11] Patent Number: 5,087,066
[45] Date of Patent: Feb. 11, 1992

[54] FOLDABLE BABY STROLLER
[75] Inventor: Chai Mong-Hsing, Walnut, Calif.
[73] Assignee: Baby Trend, Inc., Industry, Calif.
[21] Appl. No.: 311,492
[22] Filed: Feb. 16, 1989
[51] Int. Cl.[5] .............................................. B62B 7/06
[52] U.S. Cl. ................................. 280/644; 280/650; 280/658; 280/47.38; 297/46
[58] Field of Search ............... 280/642, 644, 647, 641, 280/649, 650, 658, 47.38; 297/46, DIG. 4

[56] References Cited
U.S. PATENT DOCUMENTS

| | | | |
|---|---|---|---|
| 3,100,652 | 8/1963 | Schenkman | 280/644 |
| 4,506,907 | 3/1985 | Miyagi | 280/642 |
| 4,632,420 | 12/1986 | Miyagi | 280/642 |
| 4,697,823 | 10/1987 | Kassai | 280/644 |
| 4,770,437 | 9/1988 | Glaser | 280/642 |

FOREIGN PATENT DOCUMENTS
1576574 10/1980 United Kingdom ............... 280/644

Primary Examiner—Charles A. Marmor
Assistant Examiner—Michael Mar
Attorney, Agent, or Firm—Beehler & Pavitt

[57] ABSTRACT

A foldable infant stroller comprises a frame for supporting an infant seat, the frame comprised of three U-shaped frame members which provide a push handle, a child restraint bar and a support for the front of the seat respectively, the three members being interlinked for folding and unfolding of the frame. A safety latch is provided for locking the frame in unfolded condition. The safety latch is released to allow folding of the frame by lifting up with the foot, and is thus safe against accidental release by a child stepping on the release bar.

13 Claims, 3 Drawing Sheets

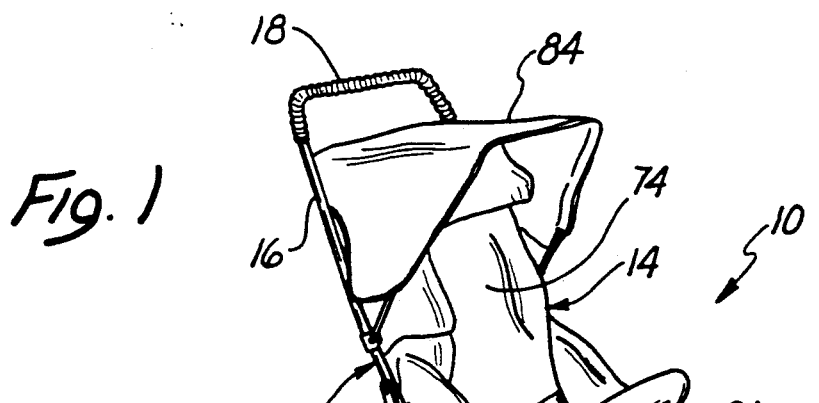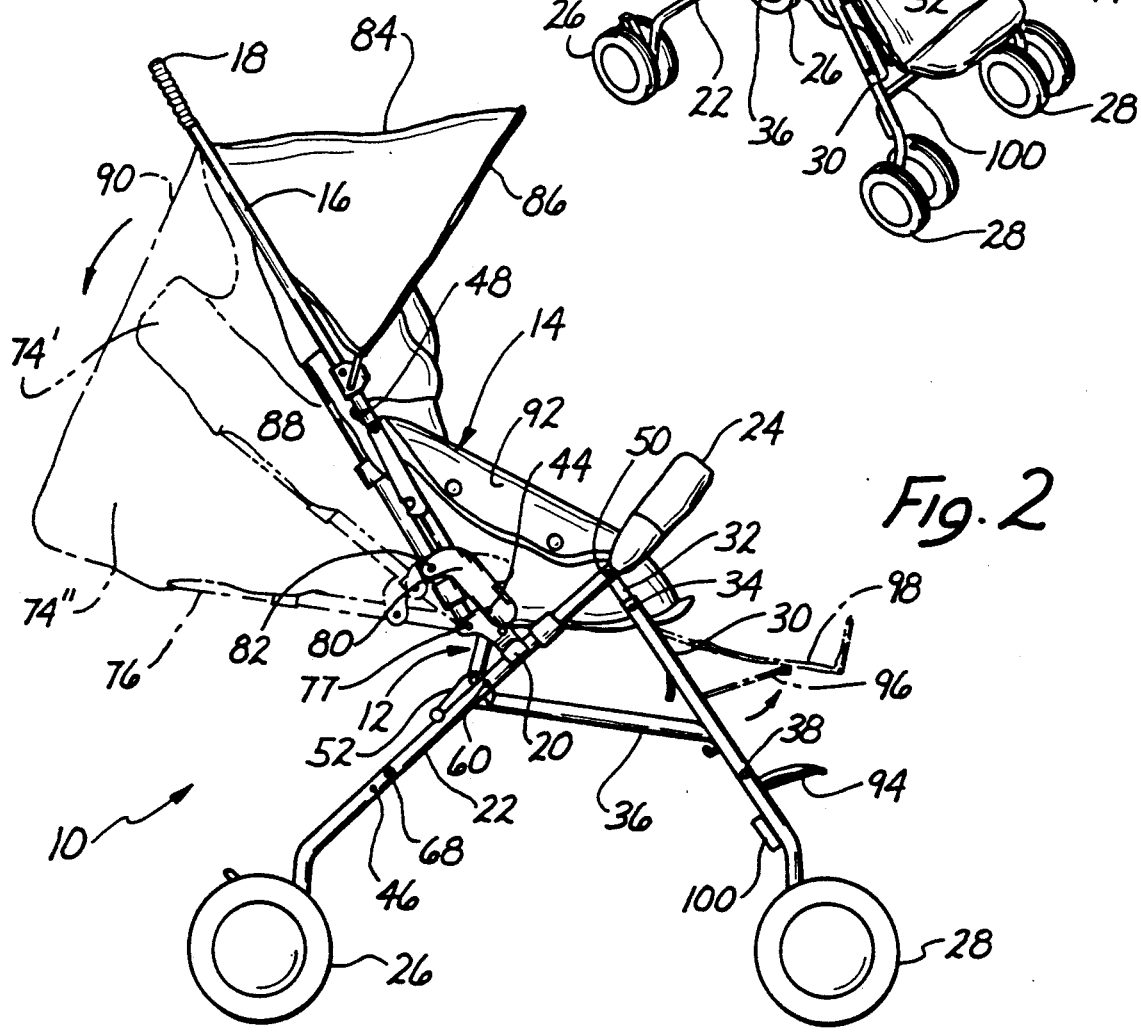

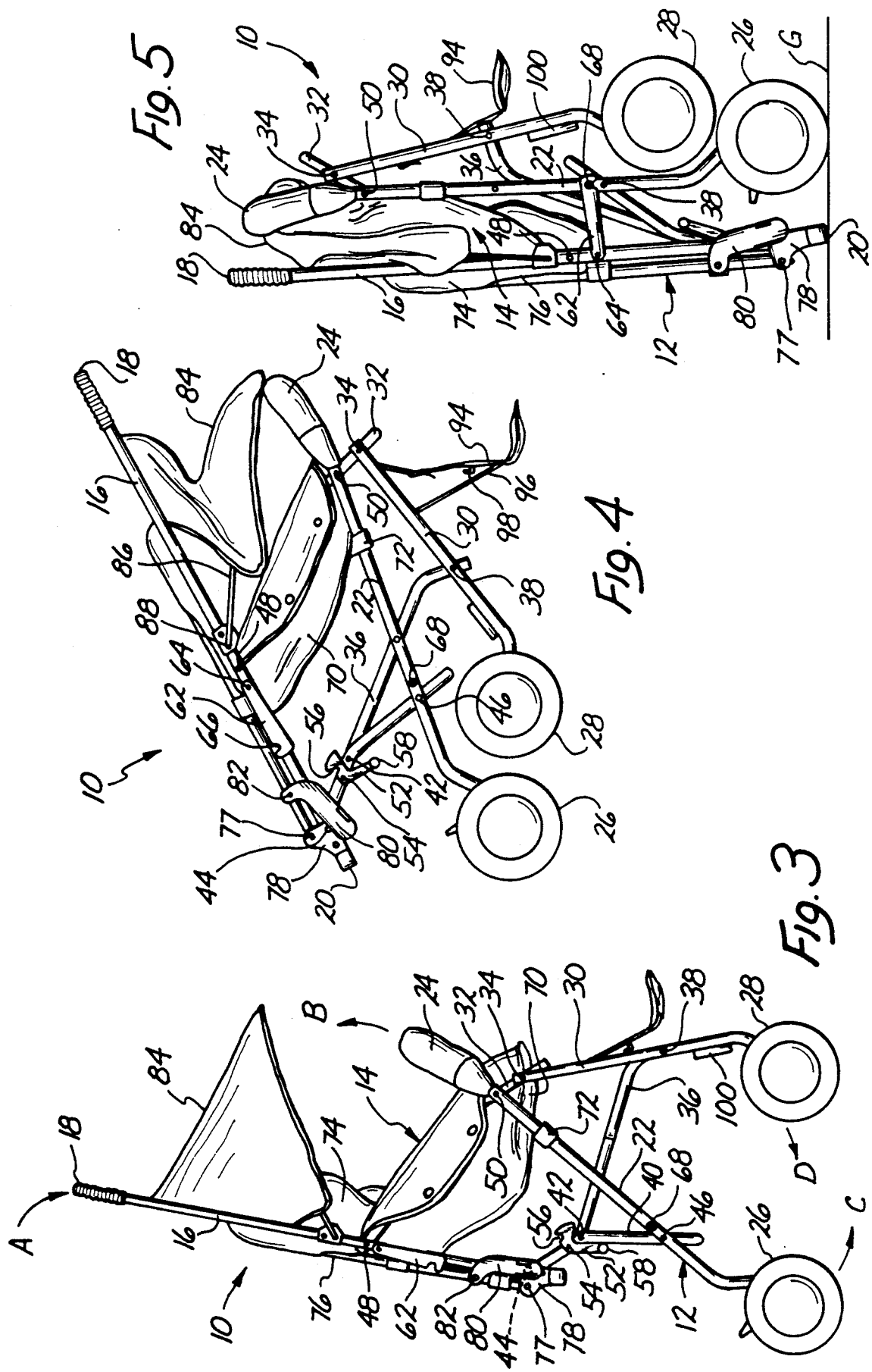

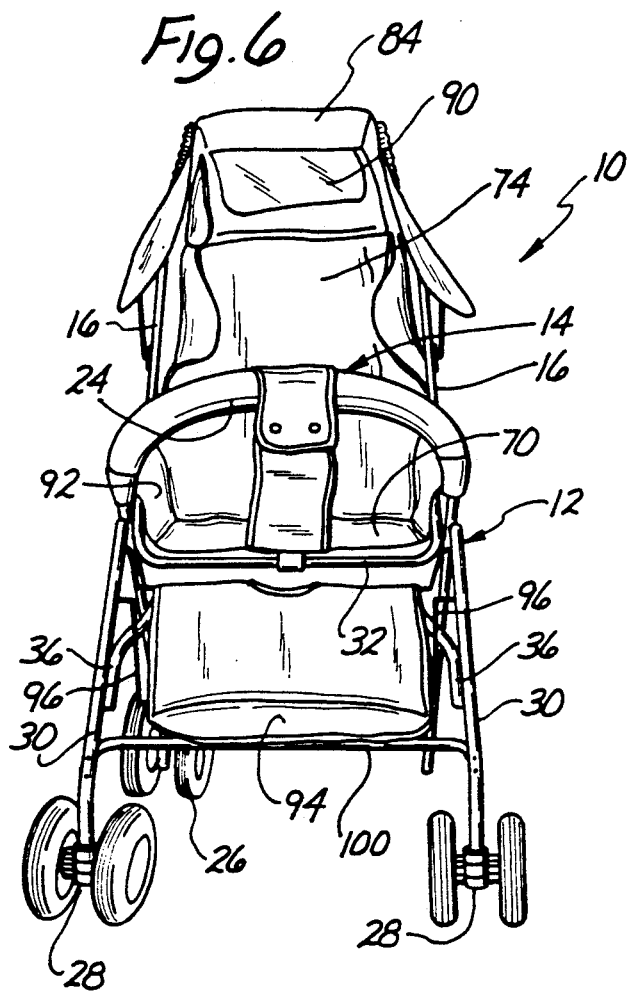
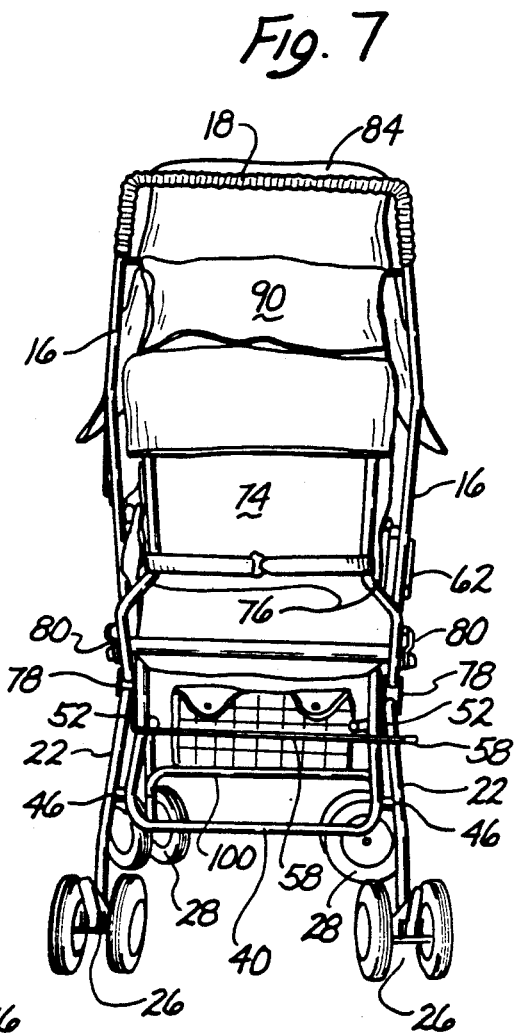
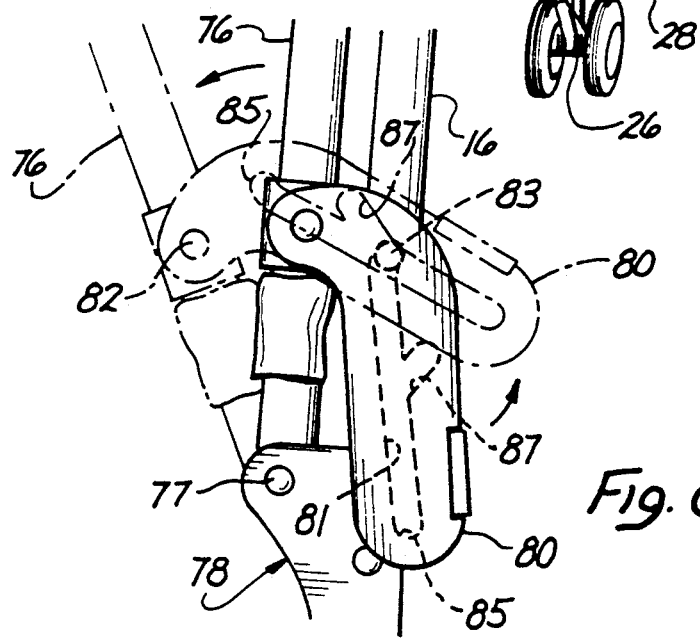

FOLDABLE BABY STROLLER

FIELD OF THE INVENTION

The present invention pertains generally to the field of infant carriages and is more particularly directed to certain improvements in baby strollers of the foldable or collapsible type.

BACKGROUND OF THE INVENTION

Foldable infant strollers have been in popular use for many years and typically consist of a wheeled tubular frame comprised of two or more frame members which are hinged or pivoted to each other so that the frame can be deployed to a condition where the wheels are spaced apart for rolling on a ground surface, or collapsed to a compact configuration where the wheels are adjacent to each other for convenient carrying and storage of the stroller. An infant seat typically made of fabric and foam padding is suspended from the frame. Various accessories, often removable, may be attached to the frame such as a retractable hood for shielding the infant against direct sunlight, a foot rest, and various storage aids, such as baskets or bags for carrying the usual assortment of supplies necessary for infant care.

Many such foldable strollers are in current manufacture, but the general arrangement and design tends to be similar from one manufacturer to another, and certain shortcomings in these foldable strollers are widespread in the industry and improvement is needed.

Specifically, one shortcoming prevalent among foldable strollers in current use is the tendency of the stroller to collapse towards a folded condition upon release of a single latch. It is common practice to provide a release rod on the rear of the frame which can be easily depressed by pushing down with a foot to release the latch and allow the frame to fold. Such a latch arrangement can be accidentally released by older siblings climbing up on the carriage, as young children are prone to do, leading to possible injury to an infant resting in the carriage when it collapses in such a manner.

It is also desirable to provide a foldable stroller frame which in a folded condition will be self-supporting in a free standing condition. It is present practice in the industry to provide the stroller frames with an attached auxiliary stand or support bracket which assists in supporting the frame in a free standing condition. It is desirable however to provide a stroller frame which is configured and arranged so as to render unnecessary such auxiliary brackets or supports.

It is further desirable to make the folded frames as compact as possible in a folded condition for easier storage, especially for underseat or overhead storage on an airliner. Many strollers in current use are unsatisfactory in that their frames are relatively bulky even when folded, and additional improvement in this aspect is needed.

SUMMARY OF THE INVENTION

These and other shortcomings of presently known and used foldable baby strollers are addressed by the improvements of this invention.

In a first aspect of the invention, an infant stroller has a foldable frame including a forward set of wheels on one frame member and a rear set of wheels on another frame member, the forward and rear sets being spaced apart in an unfolded condition of the frame and adjacent to each other in a folded condition of the frame, an infant seat supported on the frame, and a safety latch for normally locking the frame in the unfolded condition, the frame being characterized in that it is stable and self-supporting in the unfolded configuration even with the safety latch in release position.

In a second aspect of the invention, the safety latch is arranged and configured such that it must be positively lifted to the release position while said frame is being folded for greater security against accidental folding. The safety latch preferably includes a horizontal release rod arranged on the frame for convenient lifting with a foot freeing the hands for folding the frame.

In a third aspect of the invention, a first and a second frame members each have a transverse intermediate portion which in the first frame member serves as a pushing bar and in the second frame member serves as a child restraint bar; the frame members being interconnected by linkage elements such that in an unfolded configuration the first and second frame members are generally transverse to each other and in a folded condition are substantially parallel and approximately in register with each other so that the push bar does not protrude significantly above the restraint bar for compact folding.

In a fourth aspect of the invention, the frame is characterized in that the lower ends of the first frame member define together with the rear wheels attached to the lower ends of the second frame member a stable base on which the folded frame is self-supporting and free standing in upright on a ground surface.

More specifically, the infant stroller includes a frame and an infant seat suspended from the frame; the frame having a first frame member of inverted U-shape having two lower ends; a second frame member of inverted-U shape carrying at its lower extremities a set of rear wheels; the first and second frame members each having a transverse intermediate portion which in the first frame member serves as a pushing bar and in the second frame member serves as a child restraint bar; a U-shaped third frame member pivoted to both the first and second frame members; forward legs second frame members each having a transverse intermediate portion which in the first frame member serves as a pushing bar and in the second frame member serves as a child restraint bar; a U-shaped third frame member pivoted to both the first and second frame members; forward legs pivoted to the third frame and carrying a set of forward wheels; and linkage elements interconnecting the legs and the first and second frame members such that the frame is foldable between an unfolded condition wherein the first and second frame members lie are generally transverse to each other, and a folded condition wherein the first and second members are substantially parallel; the frame being characterized in that in the unfolded condition the weight of the frame or the wheels resting on a ground surface operates to stably hold the frame in unfolded condition so that at least one set of wheels must be lifted away from the ground to fold the frame. The frame can be conveniently folded by holding down the the push bar while pulling up on the restraint bar after releasing the safety latch.

BRIEF DESCRIPTION OF THE DRAWINGS

FIG. 1 is a perspective view of a foldable baby stroller according to the present invention shown in deployed configuration for carrying an infant;

FIG. 2 is a side elevational view of the stroller of FIG. 1, showing in phantom lining the backrest of the infant seat in intermediate and fully reclined positions;

FIG. 3 is a side elevational view of the stroller of FIG. 2 showing the stroller in a first stage of the folding process;

FIG. 4 is a side elevational view of the stroller in a second, more advanced stage of the folding process;

FIG. 5 is a side elevational view showing the stroller of FIG. 2 in a fully folded position and illustrating the self-supporting, free-standing capability of the improved frame;

FIG. 6 is a front elevational perspective of the stroller of FIGS. 1 through 5 shown in deployed configuration;

FIG. 7 is a rear elevational perspective of the stroller of FIG. 6; and

FIG. 8 is an enlarged detail view of the reclinable backrest latch assembly.

DETAILED DESCRIPTION OF THE PREFERRED EMBODIMENT

With reference to the drawings, FIGS. 1, 2 and 6 show the improved baby stroller 10 which comprises a wheeled folding frame 12 on which is supported an infant seat 14. The frame 12 includes a first inverted U-shaped frame member 16 having an upper horizontal portion 18 which serves as a push bar for the stroller and a pair of downwardly extending legs which, in the deployed configuration of the carriage 10, have lower ends 20 which rest against the legs of a second inverted U-shaped frame member 22 which has an upper horizontal portion 24 covered with padding and serving as a child restraint bar. A set of rear wheels 26 is attached to the lower ends of the second frame member 22.

A third U-shaped frame member 32 is pivoted at 48 at two upper ends to the first frame member 16 and to the second frame member 22 at 50. A pair of front legs 30 are pivoted at their upper ends at 34 to member 32 and each leg carries at its lower extremity a front wheel assembly 28. A linkage member 36 is pivoted at one end to each leg 30 at 42 and at an opposite ends to a U-shaped rear cross brace 40 best seen in FIGS. 3-5 and 7, but largely hidden behind the frame member 22 in the views of FIGS. 1 and 2. The rear brace 40 in turn is pivoted at its upper ends at 44 to the legs of the first frame member 16 and near its lower ends at 46 to the second frame member 22. A transverse front brace member 100 is fixed between lower portions of the forward legs 30 to provide additional lateral rigidity to the frame 12.

The infant seat 14 is suspended from and supported by the three frame members 16, 22 and 32 between the push bar 18 and the restraint bar 24. The side portions of the third frame member 32 define side arm supports for the infant seat 14.

In the deployed configuration shown in FIG. 2, it will be appreciated that the weight of the stroller represented primarily by the seat 14, first frame member 16 and the various elements attached thereto are situated approximately at the apex of a triangle defined by the second frame member 22, the front legs 30 and the undeelying ground surface. This triangle is approximately equilateral and the apex represented by the pivot point 50 is approximately centered on the base of the triangle represented by the distance between the front wheels 28 and wheels 26 in the deployed condition. The weight of the stroller, therefore, bears down on the hinged apex 50 and consequently tends to spread apart the wheel sets 26, 28. The maximum spacing between the front and rear wheels sets, however, is limited by the linkage members 36 and associated components. The net result of this frame construction and arrangement is that the frame is stable and self-supporting in the deployed configuration without resort to any latches or locking elements. Nevertheless, in the interest of frame rigidity and to prevent unnecessary movement of the various frame components during normal use, particularly when one or the other set of wheels is lifted off the ground so as to negotiate steps or sidewalk curbs, etc., a safety latch 52 is pivoted at 54 to the rear cross brace member 40. The latch 52 has a notch 56 on one side of the pivot point 54 and is attached at its opposite end on the other side of the pivot point 54 to a release rod 58. The release rod 58, as seen in FIG. 7, extends horizontally across the rear side of the stroller frame between two latches 52, each latch on an opposite side of the rear brace member 40, and the rod 58 is conveniently arranged so that it can be easily pushed up by the foot of a person standing behind the stroller. By lifting the release rod 58, the latch 52 is pivoted so that the notch 56 swings downwardly and away from a locking pin 60 fixed to the second frame member 22 and received within the notch 56. The safety latch 52 is normally spring loaded towards a locked position wherein the notch 56 is urged upwardly by the biasing spring into engagement with the locking pin 60.

The frame 12 is folded from the deployed configuration of FIG. 2 to a compact folded configuration shown in FIG. 5 by first releasing the latch 52, i.e. lifting the release bar 58 with one foot to disengage the locking pin 60 from notch 56. While maintaining the latch so disengaged and grasping the push bar 18 with one hand and the restraint bar 24 with the other hand, the folding operation is executed by pulling up on the restraint bar 24 while holding down the push bar 18 as suggested by arrows A and B in FIG. 3. In executing this operation, it will be found helpful to partly or wholly lift the carriage 10 slightly off the ground inasmuch as the rear wheels 26 tend to swing downwardly in a shallow arc during the folding operation towards the front wheels 28, while the front wheels also swing backwards towerds the rear wheels, as suggested by arrows C and D in FIG. 3.

In the fully deployed configuration of FIG. 10, it is seen how the first frame member 16 lies above and in a plane which is generally perpendicular to the plane occupied by the second frame member 22, while the third frame member is generally transverse to both the first and second frame members 16 and 22, with the seat 14 supported between these three frame members. In FIG. 3, it is seen how the upper frame member 16 pivots forwardly away from the transverse relationship of FIG. 2 towards an ultimately parallel relationship with the frame member 22 in the fully folded configuration of FIG. 5, as a result of the arrangement dimensioning and cooperation of the various frame components and elements At the same time, the third frame member also swings upwardly towards a similar parallel relationship between the other two frame members 16 and 22.

FIG. 4 illustrates a more advanced stage of the folding operation wherein the rear frame member 18 is nearly parallel with the forward frame member 22. It will be noticed that in the folding process, the two members 18 and 22 also move into approximate longitudinal register wherein the upper and lower ends of the two frame members 16, 22 come into approximate alignment. In other words, in the folded position of FIG. 5, the push bar 18 has come down to a position approximately level with the restraining bar 24 while the lower ends 20 of the first frame member 16 now rest on the ground surface G and together with the rear wheels 26 provide a stable four-point base on which the folded stroller 12 may stand freely in an erect position as illustrated, a great convenience which leaves the infant's caretaker free to attend to the infant with both hands while the folded stroller stands upright with the handle 18 available ready for convenient retrieval. From the folding sequence illustrated in FIGS. 3–5, it will also be apparent that the forward set of wheels 28 rises above the rear set of wheels 26 such that in the folded configuration of FIG. 5, the forward wheels 28 are stacked above the rear wheels 26, and the seat 14 is folded up between the now parallel frame members 16, 22 and 32. The stroller is secured against unfolding from the folded up condition of FIG. 5 by means of a second latch arm 62 pivoted at 64 to the first frame member 16 and notched at 66 to engage a pin 68 fixed to the second frame member 22, as shown in FIG. 5.

The seat 14 has forward bottom portion 70 which is stationary and rests on the transverse intermediate portion of the U-shaped third frame member 32 and is further supported by means of loops 72 of nylon webbing sewn to the seat and looped around the second frame member 22. The seat 14 also includes padded side portions 92 which are wrapped over side portions of the third frame member 32 so as to provide cushioning and lateral support to the infant. The seat 14 has a reclinable backrest portion 74 which is connected to the bottom portion 70 by a fabric hinge, and supported between the side portions of the first frame member 16 by a backrest frame member 76 which also has a generally inverted U-shaped and has two lower ends each pivoted at 77 within a fitting 78 which is itself fixed to the ends of the first frame member 16 and which also defines a lower end 20. The fittings 78 may be made out of plastic while the various pivot points mentioned throughout the specification can be steel rivets. The various frame members, frame elements and linkages which together make up the frame 12 can be made of steel tubing of uniform diameter.

The backrest 74 is reclinable by virtue of pivoted support member 76. A third latch 80, pivoted at 82 to the backrest frame 76, shown in the enlarged view of FIG. 8 has an internal slot 81 shown in dotted lining for receiving a pin 83 fixed to the first frame member 16. The slot 81 has two opposite ends 85 and an intermediate notch 87 so as to hold the backrest frame 76 at any one of three selectable positions illustrated in FIG. 2, from a generally upright normal position, through an intermediate semi-reclined position shown in phantom lining, to a fully reclined and generally horizontal position also shown in phantom lining wherein the seat 74 is converted into a crib. A footrest 94 is supported on a transverse rod extending between the two forward legs 30. The footrest 94 swivels about this support rod and may be raised to a horizontal position shown in phantom lining in FIG. 2 and supported in this position by means of a second support rod 96 which swivels between the forward legs 30 and can be manually fitted into a pair of hooks 98 provided on the underside of the footrest 90. In such an elevated position, the footrest serves as an extension of the seat 70 and the reclined backrest 74, in effect extending the crib for additional leg room.

The stroller is further provided with a retractable hood made of fabric supported on a wire frame 86 which is pivoted at 88 on fittings mounted to the first frame member 16 so that the frame may be swung backwards from the position shown in FIG. 2 up against the first frame member 16 as shown in the sequence of FIGS. 4 and 5. A flap 90 extends from the rear of the hood 84 to the top of the seat 74 as best seen in FIG. 2 in dotted lining so as to generally close and shield the rear of the stroller seat 74 when the seat is in reclined position.

From the foregoing it will be appreciated that the baby stroller described and illustrated herein offers improved safety features against accidental folding, is self-supporting in a folded free-standing condition and when folded forms a compact generally rectangular package for easier handling, carrying and storage.

While a preferred embodiment of the invention has been shown and illustrated for purposes of clarity and example, many changes, substitutions and modifications to the described embodiment will become readily apparent to those possessed of ordinary skill in the art without, however, departing from the scope and spirit of the present invention which is defined and limited only by the following claims.

What is claimed is:

1. A foldable baby stroller comprising:
   a frame and an infant seat suspended from the frame; said frame having:
   a first frame member of inverted U-shaped having two lower ends;
   a second frame member of inverted U-shape having leg portions carrying at their lower extremities a set of rear wheels;
   said first and second frame members each having a transverse intermediate portion which in said first frame member serves as a pushing bar and in said second frame member serves as a child restraint bar;
   a U-shaped third frame member having a forward transverse intermediate portion and two rearwardly extending side portions having rearward ends connected to said first frame member, said leg portions of said second frame member being pivoted to said side portions of said third frame member at a point intermediate the ends of said side portions;
   forward leg means pivoted to said side portions of said third frame member at a location forwardly of said intermediate point and carrying a set of forward wheels; and
   linkage means interconnecting said leg means and said first and second frame members such that said frame is foldable between an unfolded condition wherein said first, second and third frame members are generally transverse to each other, and a folded condition wherein said first, second and third frame members are generally parallel to each other.

2. The stroller of claim 1, said infant seat being suspended between said first, second and third frame members.

3. The stroller of claim 1 further comprising safety means for securing said frame in said unfolded condition including a release bar extending between said lower extremities of said second frame member and connected for disengaging said safety means responsive to lifting of said release bar relative to said rear brace member, such that said safety means are not accidentally disengaged by a child stepping on said release bar.

4. The stroller of claim 3 wherein said safety means includes latch means pivoted to one of said rear brace or said second frame member, and locking pin means fixed to the other of said rear brace or said second frame member, said pin means engageable by said latch means for securing all of said frame members against relative pivotal movement.

5. The stroller of claim 4 wherein said pin means are fixed to said lower extremities of said second frame member and said latch means are notched for engaging said pin means.

6. The stroller of claim 4, wherein said release bar is connected to said latch means and arranged for disengaging said latch means from said pin means responsive to lifting of said release bar as with a foot.

7. The stroller of claim 1 wherein all of said frame members, said leg means and said linkage means are made of tubing of uniform diameter.

8. A foldable baby stroller comprising:
a frame and an infant seat suspended from the frame; said frame having:
a first frame member of inverted U-shape having two lower ends;
a second frame member of inverted U-shape having leg portions carrying at their lower extremities a set of rear wheels;
said first and second frame members each having a transverse intermediate portion which in said first frame member serves as a pushing bar and in said second frame member serves as a child restraint bar;
a U-shaped third frame member having a forward transverse intermediate portion and two rearwardly extending side portions having rearward ends connected to said first frame member, said leg portions of said second frame member being pivoted to said side portions of said third frame member at a point intermediate the ends of said side portions;
forward leg means pivoted to said side portions of said third frame member at a location forwardly of said intermediate point and carrying a set of forward wheels;
a U-shaped rear brace pivoted between said lower extremities of said second frame member and also pivoted between said lower ends of the first frame member;
linkage means interconnecting said frame members for folding and unfolding said frame; and
safety means for securing said frame in said unfolded condition including a release bar extending between said lower extremities of said second frame member and connected for disengaging said safety means responsive to lifting said release bar relative to said rear brace member, such that said safety means are not accidentally disengaged by a child stepping on said release bar.

9. The stroller of claim 8 wherein said latch means are pivoted to said rear brace member for engaging pin means fixed to said second frame member.

10. The stroller of claim 8 further comprising front brace means fixed between said forward legs for improved lateral rigidity of said frame.

11. The stroller of claim 8 wherein said seat has a reclinable backrest pivoted to the lower ends of said first frame member.

12. The stroller of claim 8 wherein all of said frame members, said leg means and said linkage means are made of tubing of uniform diameter.

13. A foldable baby stroller comprising:
a frame and an infant seat suspended from the frame; said frame having:
a first frame member of inverted U-shaped having two lower ends;
a second frame member of inverted U-shaped having leg portions carrying at their lower extremities a set of rear wheels;
said first and second frame members each having a transverse intermediate portion which in said first frame member serves as a pushing bar and in said second frame member serves as a child restraint bar;
a U-shaped third frame member having a forward transverse intermediate portion and two rearwardly extending side portions having rearward ends connected to said first frame member, said leg portions of said second frame member being pivoted to said side portions of said third frame member at a point intermediate the ends of said side portions;
forward leg means pivoted to said side portions of said third frame member at a location forwardly of said intermediate point and carrying a set of forward wheels; and
linkage means interconnecting said frame members such that said frame is foldable between an unfolded condition and a folded condition;
said seat having a front portion supported on said forward transverse portion of said third frame member and said side portions supporting sidearm padding for said seat.

* * * * *